April 19, 1949.　　　C. C. WHITTAKER　　　2,467,794
TRACTION MOTOR PROTECTIVE SYSTEM
Filed Sept. 7, 1945　　　　　　　　2 Sheets-Sheet 2
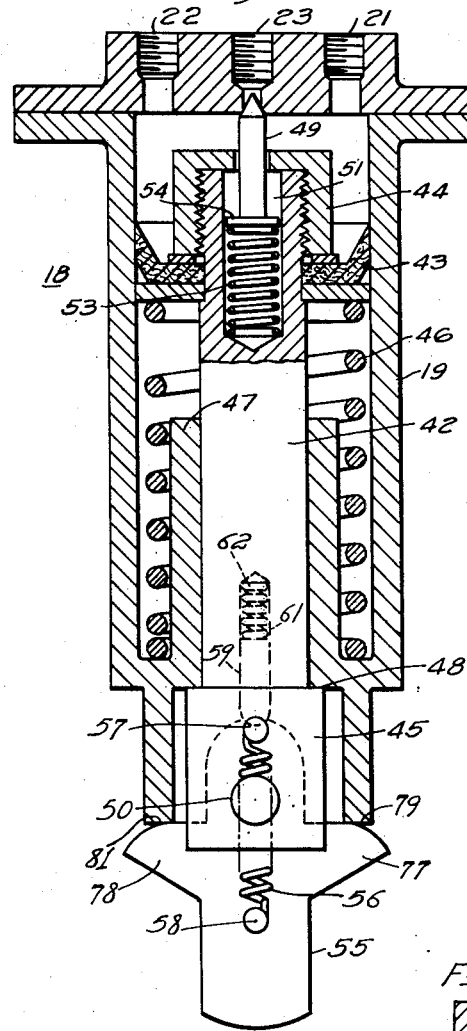
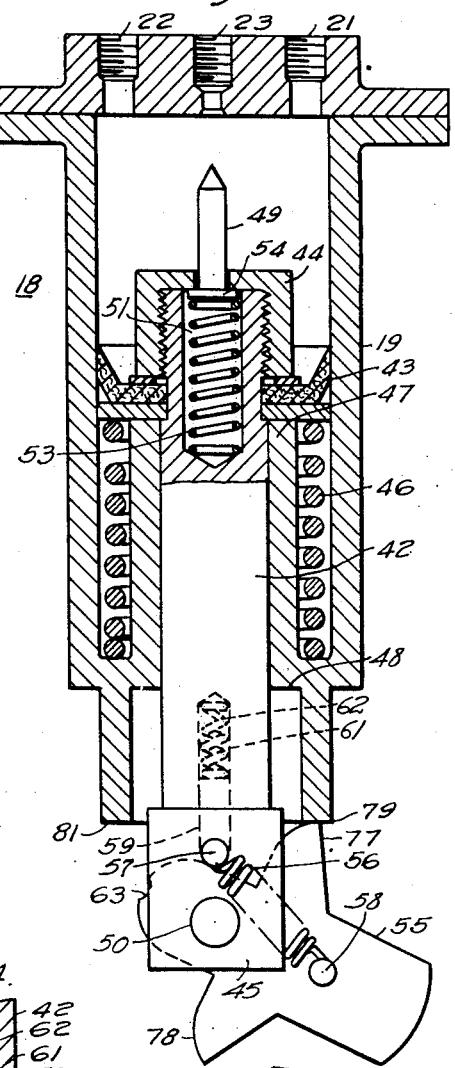
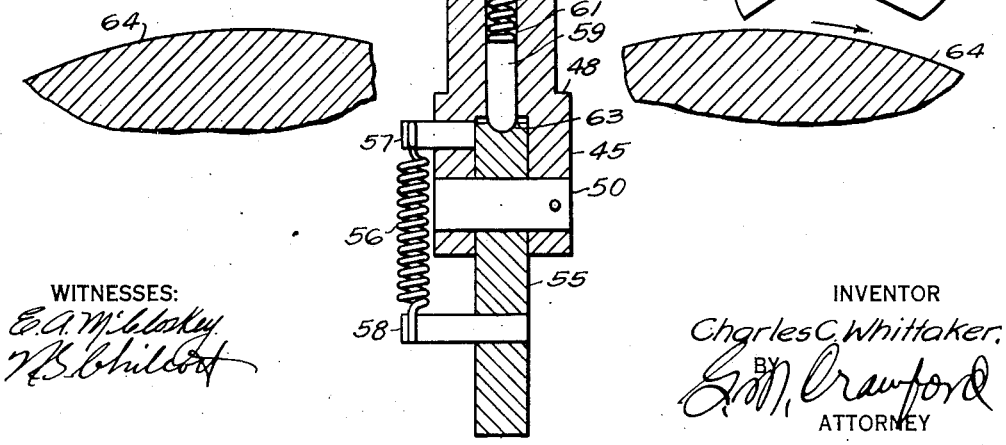
WITNESSES:
INVENTOR
Charles C. Whittaker.
BY
ATTORNEY

Patented Apr. 19, 1949

2,467,794

UNITED STATES PATENT OFFICE 2,467,794

TRACTION MOTOR PROTECTIVE SYSTEM

Charles C. Whittaker, Pittsburgh, Pa., assignor to Westinghouse Electric Corporation, East Pittsburgh, Pa., a corporation of Pennsylvania Application September 7, 1945, Serial No. 615,032

9 Claims. (Cl. 318—466)

My invention relates, generally, to control systems and, more particularly, to systems for controlling the operation of electric locomotives.

When starting a heavy train there are times when a locomotive propelled by motors of the series commutator type does not start to move during the time that the master controller is being actuated through several notches to increase the voltage applied to the motors. Under this condition, the commutator bars underneath the brushes are overheated, and the commutator may be permanently damaged.

An object of my invention is to protect the motors of a locomotive against overheating during starting.

Another object of my invention is to provide for cutting off power from the motors of a locomotive if it does not start moving within a predetermined time interval after power is applied.

A more general object of my invention is to provide a protective system for the motors of a locomotive which shall be simple and efficient in operation and which may be economically manufactured and installed.

Other objects of my invention will be explained fully hereinafter or will be apparent to those skilled in the art.

In accordance with one embodiment of my invention, an air-operated zero-speed indicator and electropneumatic devices are utilized to cut off power from the motors of a locomotive if it does not start moving within a predetermined time interval after power is applied, thereby preventing standstill burning of the commutator.

For a fuller understanding of the nature and objects of my invention, reference may be had to the following detailed description, taken in conjunction with the accompanying drawings, in which:

Fig. 2 is an enlarged view, in section, of the zero-speed indicator utilized in the system;

Fig. 3 is a view, similar to Fig. 2 showing the indicator in its lowermost position, and Fig. 4 is a detail view of a portion of the indicator structure.

Figure 1:
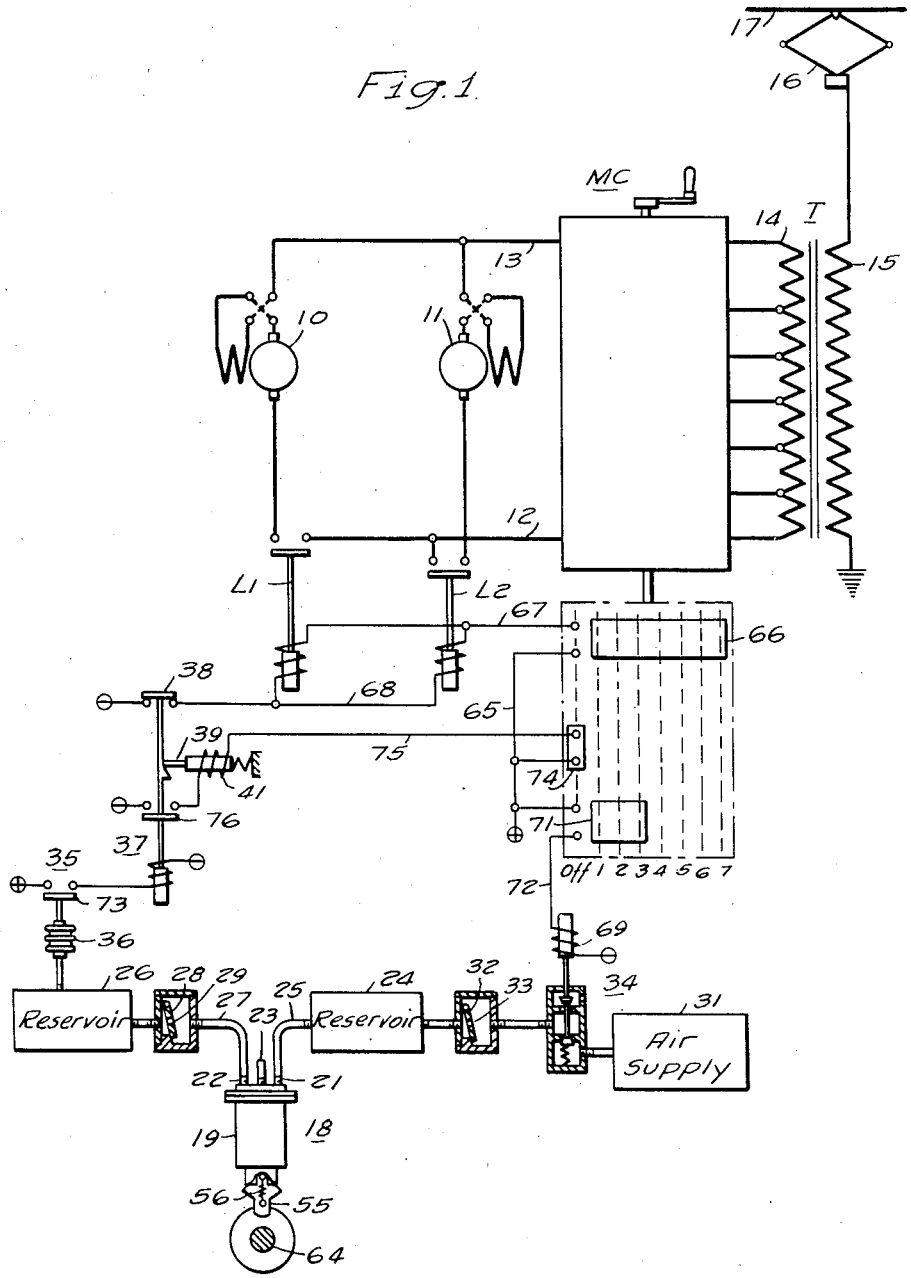
Figure 1 is a diagrammatic view of a control system embodying the principal features of my invention.

Referring to the drawings, and particularly to Fig. 1, the system shown therein comprises a pair of electric motors 10 and 11 which may be of the series commutator type suitable for propelling an electric locomotive (not shown), and a pair of switches L1 and L2 for connecting the motors 10 and 11 across power conductors 12 and 13 which may be connected to selected taps on a secondary winding 14 of a power transformer T by means of a master controller MC in a manner well known in the art. The primary winding 15 of the transformer T may be energized through a current collector 16 which engages a trolley conductor 17. The trolley conductor 17 may be energized from any suitable source of alternating current power, such as a power generating station (not shown).

As explained hereinbefore, there are times when the locomotive may not start moving a heavy train while the controller MC is being actuated through its first few notches to increase the voltage applied to the motors 10 and 11. Under this condition, there is danger of the commutator bars, which are underneath the brushes, becoming overheated, thereby resulting in serious damage to the commutator. In order to prevent the commutator from becoming overheated, I have devised the present system which provides for automatically disconnecting the motors from the power source if the locomotive does not start moving within a predetermined time interval after power is applied to the motors, the time interval being such that the commutator will not become dangerously overheated.

As shown, my protective system comprises a fluid-pressure actuated zero-speed indicating device 18 having a cylinder 19 with an incoming port 21, an outgoing port 22 and an exhaust port 23. A reservoir 24 is connected to the incoming port 21 through a pipe 25, and a similar reservoir 26 is connected to the outgoing port 22 through a pipe 27 and a check valve 28 having an orifice 29 disposed in the valve 28. The reservoir 24 is connected to an air pressure supply tank 31 through a check valve 32, having an orifice 33 therein, and an electromagnet valve 34. A quick-acting pressure switch 35, which may be of a type well known in the art having a flexible bellows 36, is connected to the reservoir 26. The switch 35 controls the energization of a control switch 37 having contact members 38 connected in the energizing circuit for the actuating coils of the switches L1 and L2. The switch 37 is provided with a spring-biased latching device 39 for latching the switch in its uppermost position. The latch 39 may be released by energizing a solenoid coil 41, as will be explained more fully hereinafter.

As shown more clearly in Figs. 2, 3 and 4, the zero-speed indicating device 18 comprises a piston rod 42 disposed in the cylinder 19 and having a piston washer 43 secured on its upper end by a collar nut 44 and an integral yoke 45 on its lower end. The piston 42 is biased upwardly by a spring 46 and is forced downwardly when the air pressure in the cylinder 19 is sufficient to overcome the force of the spring 46. The downward travel of the piston is limited by an internal sleeve 47 in the cylinder 19. The upward travel of the piston is limited by a shoulder 48 which engages the lower end of the sleeve 47.

A valve member 49 is disposed in a recess 51 in the upper end of the piston rod 42 and is biased upwardly by a spring 53 to close the exhaust port 23. The valve member 49 is retained in the piston rod by a shoulder 54 which engages the collar of the nut 44.

As shown in Fig. 4, a finger 55 is pivotally mounted in the yoke 45 on a pin 50. An over-center toggle spring 56 is stretched between a pin 57 disposed in the yoke 45 and a pin 58 disposed in the finger 55. A pin 59 is disposed in a recess 61 in the lower end of the piston rod 42 and is biased downwardly by a spring 62 into a notch 63 provided in the upper end of the finger 55. The pin 59 functions to retain the finger 55 in its central position except when it is moved from that position by engagement of the lower end of the finger 55 with a rotating axle 64 of the locomotive, as will be explained more fully hereinafter.

In order that the function of the foregoing apparatus may be more clearly understood, the operation of the system will now be described in more detail. Assuming that it is desired to start the locomotive, the master controller MC may be actuated to position 1, thereby closing the switches L1 and L2 to connect the motors 10 and 11 to the low voltage tap of the secondary winding 14 of the transformer T. The energizing circuit for the actuating coils of the switches L1 and L2 extends from positive through conductor 65, a segment 66 on the controller MC, conductor 67, the actuating coils of the switches L1 and L2, conductor 68 and the contact members 38 of the switch 37 to negative.

When the controller MC is actuated to position 1, the actuating coil 69 of the magnet valve 34 is energized through a circuit which extends from positive through conductor 65, a segment 71 on the controller MC, conductor 72 and the coil 69 to negative. The energization of the coil 69 operates the magnet valve 34 to admit air from the tank 31 through the orifice 33 to the reservoir 24. Air pressure is built up slowly in the reservoir 24 and air is admitted through the incoming port 21 to the cylinder 19 of the zero-speed indicator 18. As the pressure builds up in the cylinder 19, the piston rod 42 moves downwardly until the finger 55 engages the axle 64. If the axle 64 is not rotating, the downward travel of the piston 42 is stopped by the finger 55 engaging the axle. Therefore, the piston cannot travel downwardly sufficiently to open the valve 49 which is kept closed by the spring 53. Accordingly, air passes through the cylinder 19 and the outgoing port 22 through the orifice 29 into the reservoir 26. The orifice 29 and the reservoir 26 may be so proportioned that the reservoir will take a predetermined time interval, for example, fifteen seconds, to accumulate a pressure high enough to operate the pressure switch 35 to close its contact members 73. When the contact members 73 are closed, the actuating coil of the switch 37 is energized to open the contact members 38 of this switch, thereby de-energizing the actuating coils of the switches L1 and L2 which open to disconnect the motors 10 and 11 from the power source.

As explained hereinbefore, the switch 37 is latched in its open position by the latch 39 and can be reclosed only by returning the controller MC to the off position, thereby energizing the solenoid coil 41 through a switch which extends from positive through conductor 65, a segment 74 on the controller MC, conductor 75, the coil 41 and an interlock 76 on the switch 37 to negative.

When the controller MC is returned to the off position, the magnet valve 34 is deenergized thereby permitting the air to be exhausted from the reservoir 26 through the check valve 28, the cylinder 19, the reservoir 24, the check valve 32 and the magnet valve 34. The controller MC may then be actuated to a position to reapply power to the motors in another attempt to start the locomotive.

It will be noted that the contact segment 71 is illustrated as extending over the first three positions of the master controller MC, thereby permitting the protective control system to be effective when the controller is actuated as far as the third position. This position may be such that the standstill motor current will not exceed the setting of the overload current protective apparatus usually provided on electric locomotives but which is not shown in the present diagram. In this manner, the system herein described functions to prevent the motors from remaining connected to the power source for longer than predetermined time intervals if the locomotive does not start moving, thereby preventing burning of the commutator bars. The power may be reapplied to the motors at predetermined intervals until the locomotive finally starts.

If the locomotive axle 64 is rotating when the air pressure is built up in the cylinder 19 and the finger 55 engages the axle, power should not be cut off from the motors since the danger of burning the commutator bars is eliminated by the rotation of the motors. If the axle 64 is rotating in the direction indicated by the arrow in Fig. 3 when the finger 55 is pressed against the axle, the finger is rotated about the pin 50 as shown. As soon as the finger 55 is rotated slightly to disengage the pin 59 from the notch 63, the toggle spring 56 pulls the finger 55 out of engagement with the axle 64. The piston rod 42 can then travel downwardly until stopped by the upper end of the sleeve 47.

As shown in Fig. 3, when the piston rod 42 is in its lowermost position, the nut 44 engages the shoulder 54 on the valve member 49, thereby opening the exhaust port 23. This exhausts the air from the reservoir 24 and any pressure that may have accumulated in the reservoir 26. The entire piston assembly then returns to its uppermost position, and in so doing, an ear 77 or 78, depending upon the direction of rotation of the axle 64, engages a stop 79 or 81 on the lower end of the cylinder 19 to reestablish the straight line position of the finger 55 and the piston rod 42. The pin 59 engages the notch 63 in the upper end of the finger 55 to maintain this straight line position during the downward stroke of the piston.

The volume of the reservoir 24 and the size of the orifice 33 may be so proportioned that the piston 42 makes a downward stroke to engage a rotating axle at predetermined time intervals, for example, one each three seconds, which will be sufficiently slow to prevent excessive wear on the device and to prevent the device from striking hammer blows against the axle. As explained hereinbefore, the present system becoms ineffective after the controller MC is actuated past the first few or starting notches. Thus, the operation of the piston 42 stops after the controller is actuated to one of the running positions when the locomotive is moving and the present protective system is no longer required to function.

It will be understood that the time intervals during which power may be kept on the motors without the locomotive moving may be controlled in several different ways. Thus, the volumes of the reservoirs 24 and 26 and the sizes of the orifices 29 and 33 may be changed to vary the time interval. The pressure required to operate the pressure switch 35 may be changed or the pressure of the air supply system may also be changed. Therefore, the system may be adjusted to suit various conditions of operation.

From the foregoing description, it is apparent that I have provided a system which protects the motors of a locomotive from being sufficiently overheated during starting of the locomotive to burn the bars of the motor commutators. The system is relatively simple in operation and may be readily applied to electric locomotives which are provided with a source of compressed air or other fluid.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a system for controlling the application of power to the propelling motors of an electric locomotive in combination, a power conductor, switching means for connecting the motors to the power conductor, and fluid-pressure actuated means responsive to a standstill condition of the locomotive for causing the opening of said switching means if the locomotive does not move within a predetermined time interval after power is applied to the motors.

2. In a system for controlling the application of power to the propelling motors of an electric locomotive, in combination, a power conductor, switching means for connecting the motors to the power conductor, and electropneumatic means responsive to a standstill condition of the locomotive for causing the opening of said switching means if the locomotive does not move within a predetermined time interval after power is applied to the motors.

3. In a system for controlling the application of power to the propelling motors of an electric locomotive, in combination, a power conductor, switching means for connecting the motors to the power conductor, a rotatable controller for controlling the operation of said switching means, and control means responsive to a standstill condition of the locomotive for causing the opening of said switching means if the locomotive does not move within a predetermined time interval after power is applied to the motors, said controller causing the energization of said control means during only part of its rotative movement.

4. In a system for controlling the application of power to the propelling motors of an electric locomotive, in combination, a power conductor, switching means for connecting the motors to the power conductor, a controller for controlling the operation of said switching means, and fluid-pressure actuated means responsive to a standstill condition of the locomotive for causing the opening of said switching means if the locomotive does not move within a predetermined time interval after power is applied to the motors, said controller controlling the admission of pressure fluid to said fluid-pressure actuated means.

5. In a system for controlling the application of power to the propelling motors of an electric locomotive, in combination, a power conductor, switching means for connecting the motors to the power conductor, a controller for controlling the operation of said switching means, and electropneumatic means responsive to a standstill condition of the locomotive for causing the opening of said switching means if the locomotive does not move within a predetermined time interval after power is applied to the motors, said controller controlling the energization of said electropneumatic means.

6. In a system for controlling the application of power to the propelling motors of an electric locomotive, in combination, a power conductor, switching means for connecting the motors to the power conductor, a controller for controlling the operation of said switching means, and control means responsive to a standstill condition of the locomotive for causing the opening of said switching means if the locomotive does not move within a predetermined time interval after power is applied to the motors, said controller causing the deenergization of said control means when the controller is actuated past a predetermined position.

7. In a system for controlling the application of power to the propelling motors of an electric locomotive, in combination, a power conductor, switching means for connecting the motors to the power conductor, a controller for controlling the operation of said switching means, and fluid-pressure actuated means responsive to a standstill condition of the locomotive for causing the opening of said switching means if the locomotive does not move within a predetermined time interval after power is applied to the motors, said controller stopping the admission of pressure fluid when the controller is actuated past a predetermined position.

8. In a system for controlling the application of power to the propelling motors of an electric locomotive, in combination, a power conductor, switching means for connecting the motors to the power conductor, a controller for controlling the operation of said switching means, and electropneumatic means responsive to a standstill condition of the locomotive for causing the opening of said switching means if the locomotive does not move within a predetermined time interval after power is applied to the motors, said controller causing the deenergization of said electropneumatic means when the controller is actuated past a predetermined position.

9. In a system for controlling the application of power to the propelling motors of an electric locomotive, in combination, a power conductor, switching means for connecting the motors to the power conductor, means responsive to a standstill condition of the locomotive for causing the opening of said switching means if the locomotive does not move within a predetermined time interval after power is applied to the motors, and means for controlling said time interval.

CHARLES C. WHITTAKER

REFERENCES CITED

The following references are of record in the file of this patent:

UNITED STATES PATENTS

| Number | Name | Date |
| --- | --- | --- |
| 1,997,673 | Boothby | April 16, 1935 |